(12) United States Patent
Picard et al.

(10) Patent No.: US 7,085,554 B2
(45) Date of Patent: Aug. 1, 2006

(54) SUBSCRIBER MIGRATION SYSTEM

(75) Inventors: Donald F. Picard, Cambridge, MA (US); Douglas Daniel Raponi, Beverly, MA (US); Jose J. Capo, Pelham, NH (US); Ray Fernando Jimenez, Carlisle, MA (US)

(73) Assignee: Common Voices LLC, Boston, MA (US)

( * ) Notice: Subject to any disclaimer, the term of this patent is extended or adjusted under 35 U.S.C. 154(b) by 98 days.

(21) Appl. No.: 10/350,087

(22) Filed: Jan. 24, 2003

(65) Prior Publication Data

US 2004/0146147 A1    Jul. 29, 2004

(51) Int. Cl.
*H04M 11/10* (2006.01)
(52) U.S. Cl. ................ 455/413; 455/414.2; 455/412.2; 455/432.2; 379/88.22; 379/88.25; 379/88.18
(58) Field of Classification Search ................ 455/412, 455/575, 550, 403, 413, 415, 424, 459, 460, 455/463, 412.1, 412.2, 575.1, 550.1, 425, 455/456.5, 456.6, 561, 414.4, 418, 428, 432.2, 455/432.1, 433, 435.1, 435.2, 453, 515, 552.1, 455/458, 461, 462; 379/89, 88, 18, 230, 379/219, 332, 198, 338, 211, 210, 88.22, 379/211.02, 211.01, 221.01, 88.25, 88.04, 379/93.15, 93.24, 100.08; 709/202, 238, 709/217, 105, 227; 370/464, 468, 465, 536
See application file for complete search history.

(56) References Cited

U.S. PATENT DOCUMENTS

| | | | |
|---|---|---|---|
| 4,933,967 A * | 6/1990 | Lo et al. ...................... 379/207 |
| 5,029,199 A | 7/1991 | Jones et al. ................... 379/89 |
| 5,243,643 A * | 9/1993 | Sattar et al. ................... 379/88 |
| 5,787,153 A * | 7/1998 | Bankay et al. ................ 379/88 |
| 5,822,405 A * | 10/1998 | Astarabadi .................... 379/88 |
| 5,909,483 A * | 6/1999 | Weare et al. ............ 379/88.18 |
| 6,208,717 B1 * | 3/2001 | Yeh et al. ................ 379/88.18 |
| 6,522,727 B1 * | 2/2003 | Jones ....................... 379/88.23 |
| 2001/0042131 A1* | 11/2001 | Mathon et al. ............. 709/238 |
| 2002/0078167 A1* | 6/2002 | Shavit et al. ............... 709/217 |

(Continued)

OTHER PUBLICATIONS http://www.commonvoices.com/index1.html, Welcome to Common Voices, p.1.

(Continued)

*Primary Examiner*—Edward F. Urban
*Assistant Examiner*—Charles Chow
(74) *Attorney, Agent, or Firm*—Staas & Halsey LLP

(57) ABSTRACT

The present invention is a system that uses a migration server to access voicemail of a source system through a front-end switch via a telephony interface, obtain voice messages stored on the source system and store them on a destination system via a data interface. A host processor initiates a migration based on a mailbox migration status stored in a host database and controls the switch to provide a path from the migration server to the source system. The host processor also controls call flow and initiates pass code (PIN) digit capture of a subscriber's pass code by the switch for mailboxes to be migrated. Call flow control includes determining to which system to route an arriving call based on migration status and determining whether to output a message-waiting indicator for newly stored messages. A migration server controls call tree navigation aspects of call flow during migration. Automated speech recognition is used to help capture the voice message as opposed to the voice message envelope and to capture message attribute information as well as the subscriber's greeting and voice announcement, and to assist in voicemail menu navigation.

10 Claims, 10 Drawing Sheets

U.S. PATENT DOCUMENTS

2002/0116377 A1* 8/2002 Adelman et al. ............... 707/3
2002/0199117 A1* 12/2002 Nagaya ...................... 713/201
2004/0146147 A1* 7/2004 Picard et al. ............ 379/88.22

OTHER PUBLICATIONS http://www.commonvoices.com/solutions.html, Solutions, pp. 1-2.
http://www.commonvoices.com/wireless.html, Solutions for the Wireless Market, pp. 1-2.
http://www.commonvoices.com/wireline.html, Solutions for the Wireline Market, pp. 1-2.
http://www.commonvoices.com/equipment.html, Solutions for Equipment Suppliers, pp. 1-2.
http://www.commonvoices.com/products.html, Products, p. 1.
http://www.commonvoices.com/partners.html, Partners, p. 1.
http://www.commonvoices.com/contact.html, Contact, p. 1.
http://www.commonvoices.com/aboutus.html, About Us, p. 1.
http://www.commonvoices.com/bios.html, Corporate Overview.
U.S. Appl. No. 60/368,644, filed Mar. 28, 2002, Dunsmuir.

* cited by examiner

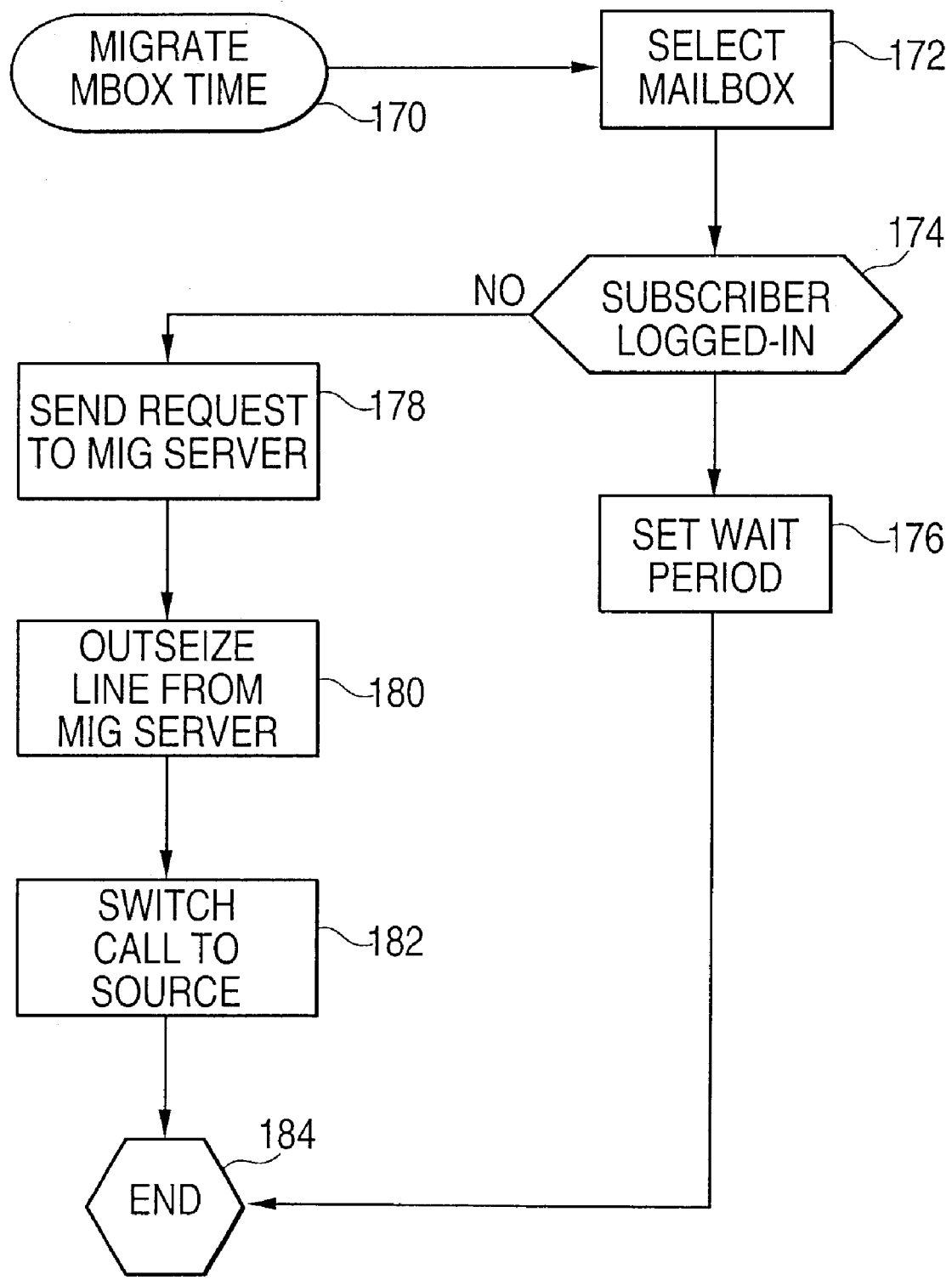

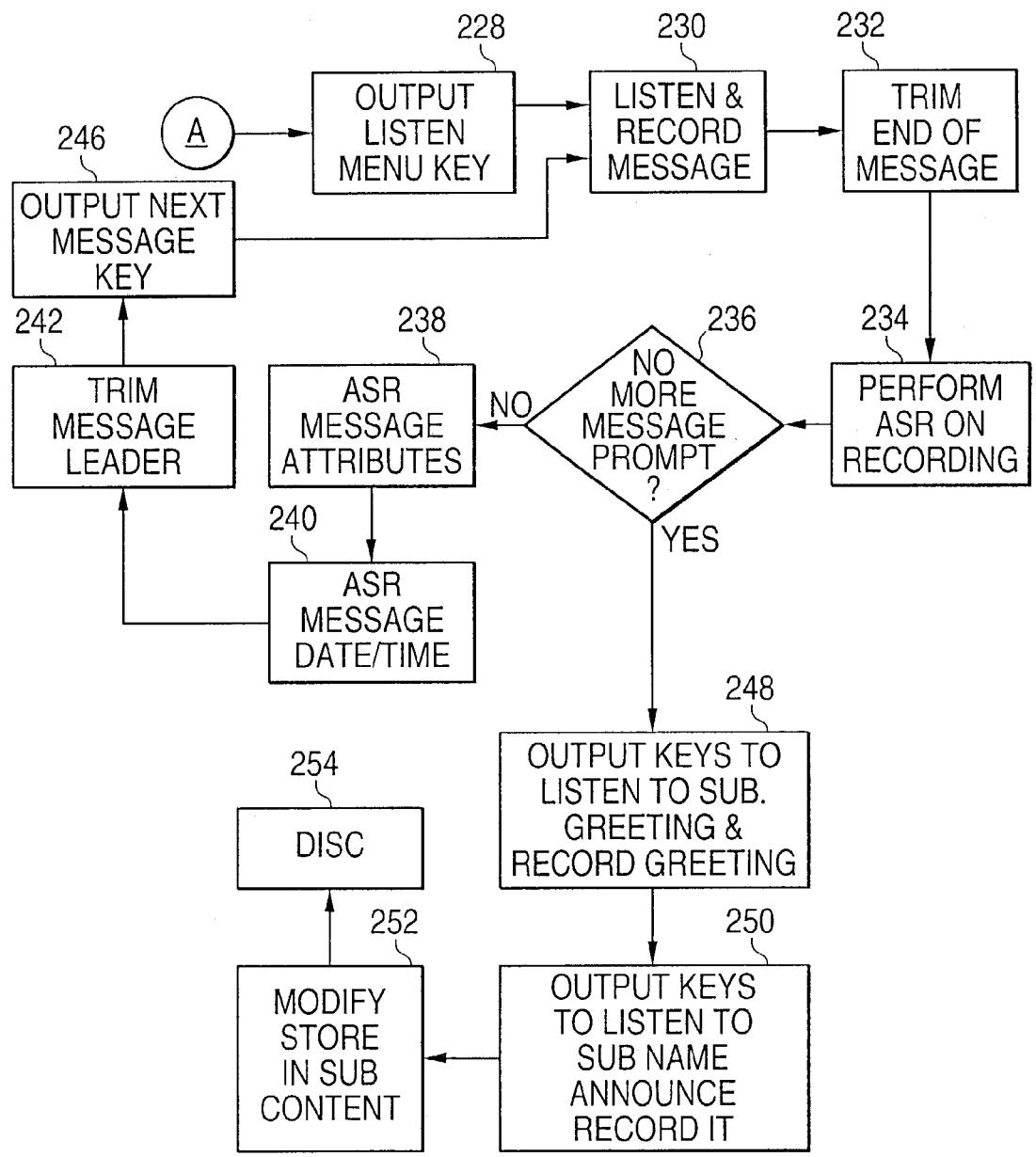

FIG. 9

| SN | PIN | STATUS | ERROR |
|---|---|---|---|
|  |  |  |  |
|  |  |  |  |

SUBSCRIBER MIGRATION SYSTEM

BACKGROUND OF THE INVENTION

1. Field of the Invention

The present invention is directed to a system for migrating audio recordings, such as voice messages, greetings, name announcements, etc. as well as attribute information, from a source system to a destination system and, more particularly, to a system that does not require knowledge of the source system application programming interface (API) and which uses automated speech recognition (ASR) to help capture the audio recordings and to help navigate the source system.

2. Description of the Related Art

There are many different voicemail systems deployed in telecom networks—from many different suppliers. Some voicemail suppliers support subscriber migration—or the ability to migrate settings, greetings, announcements, messages, and other attributes—from one platform to another. However, typically the platforms have to be from the same manufacturer, and often have to be from the same product family and software release.

There have been numerous attempts to migrate subscribers from diverse manufacturers, but these have always required that the original manufacturer provide an application programming interface (API) into their platform so the subscribers could be moved. Naturally, few (if any) manufacturers have made this a priority for their system, because it increases the likelihood that they will lose a customer to a competitor.

There are now a sufficient number of voice mailboxes deployed for there to be a sizeable market for offering a subscriber migration system and service. This market opportunity, and advances in technology, have created a need to migrate voicemail subscribers from legacy or previous generation platforms to new platforms being deployed that offer greater features and functionality. Furthermore, because of the resistance noted above, a need exists for an approach to subscriber migration that does not require that the original manufacturer provide an API for determining the subscriber features and message content from the old system.

Suppliers of next generation messaging technologies have traditionally had a significant hurdle to deploy in established networks—the installed base. The most common strategy is to propose a "cap and grow" methodology to new deployments. Basically, the proposal is to install the new messaging technology alongside the original technology, but to provision all new subscribers on the new technology, and allow the subscribers to "churn off" the old technology. While this strategy is simple to implement, it is not practical from a carrier's point of view. It requires that the carrier have duplicate facilities from each end office to both the old and the new systems to provide service to all the subscribers. The duplicate facilities significantly increase the cost of the deployment of new messaging technology—to the point where it is no longer cost effective. What is needed is a subscriber migration service that removes this barrier. In addition, a service is needed that will allow the carrier to only move the facilities to the subscriber migration system, which will switch the call to either the original system or the new system based on whether or not the particular subscriber has been migrated from the original system or not. One approach for moving the subscribers off of the legacy platform is to provision new accounts for those subscribers on a new platform while still allowing them access to their messages from the old system for a limited time period. To listen to those messages, a subscriber could be transferred to the old system upon request, or the new system could use a back channel to retrieve the messages from the legacy platform. This approach requires the aforementioned duplicate facilities, plus educating the customers of the change and expiring their messages to remove the legacy platform at a later time. What is needed is a system that does not have such requirements.

The carriers may also want to migrate subscribers from one voicemail system to another because of load requirements. For example, a mail system may originally serve several different geographical areas and one area may grow faster than another. In such a situation, to reduce costs, the carrier may want to position a new voicemail system specifically for the high growth area. What is needed is a system that will allow migration in this situation.

SUMMARY OF THE INVENTION

It is an aspect of the present invention to provide a system that seamlessly migrates voice messages from one voicemail system to another.

It is also an aspect of the present invention to provide for migration without knowledge of the API of a source system It is another aspect of the present invention to provide a switching system in the migration system to avoid facility duplication.

It is another aspect of the present invention to route calls to the appropriate system during migration.

It is another aspect of the present invention to merge message waiting indication (MWI) streams from the source and destination systems.

The above aspects can be attained by a system that uses a migration server to access voicemail of a source system through a front-end switch, obtain voice messages stored on the source system and store them on a destination system. A host processor controls call routing and migration initiation aspects of call flow and initiates pass code or personal identification number (PIN) digit capture of subscriber's pass code by the switch for mailboxes to be migrated. A migration server controls call tree navigation aspects of call flow during migration. Automated speech recognition is used to help capture the voice message and to assist in voicemail menu navigation.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 depicts initiation of a migration.

FIGS. 7A and 7B show migration operations.

FIG. 9 depicts a data structure.

DETAILED DESCRIPTION OF THE PREFERRED EMBODIMENTS

Figure 1:
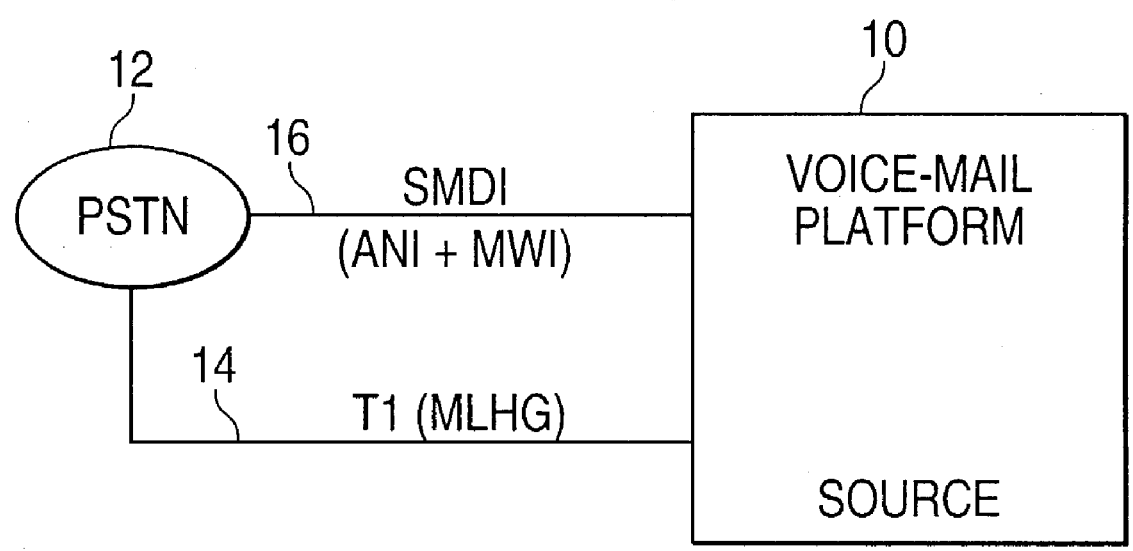
FIG. 1 illustrates the typical connections of a voicemail system to a switching system such as the public switched telephone network.

The present invention is directed to a system that allows seamless migration of voicemail subscribers from a legacy voicemail system to a new system. As depicted in FIG. 1, a typical voicemail system includes a voicemail platform 10 coupled to a public switched telephone network 12, although the platform could be a part of a private network and coupled to a private switching system, such as a private business exchange (PBX). The platform 10 typically sends and receives voice signals over a voice data communication connection 14, such as a T1 data line, having a multi-line hunt group (MLHG). The multi-line group allows the platform 10 to interact with multiple callers simultaneously whether they are subscribers retrieving messages left by callers or callers leaving messages for subscribers. The platform also communicates over a simplified message desk interface (SMDI) signaling connection 16 to receive automatic number identification (ANI) data identifying the caller and to send message waiting indicator (MWI) data to the public switched telephone network (PSTN) 12.

Figure 2:
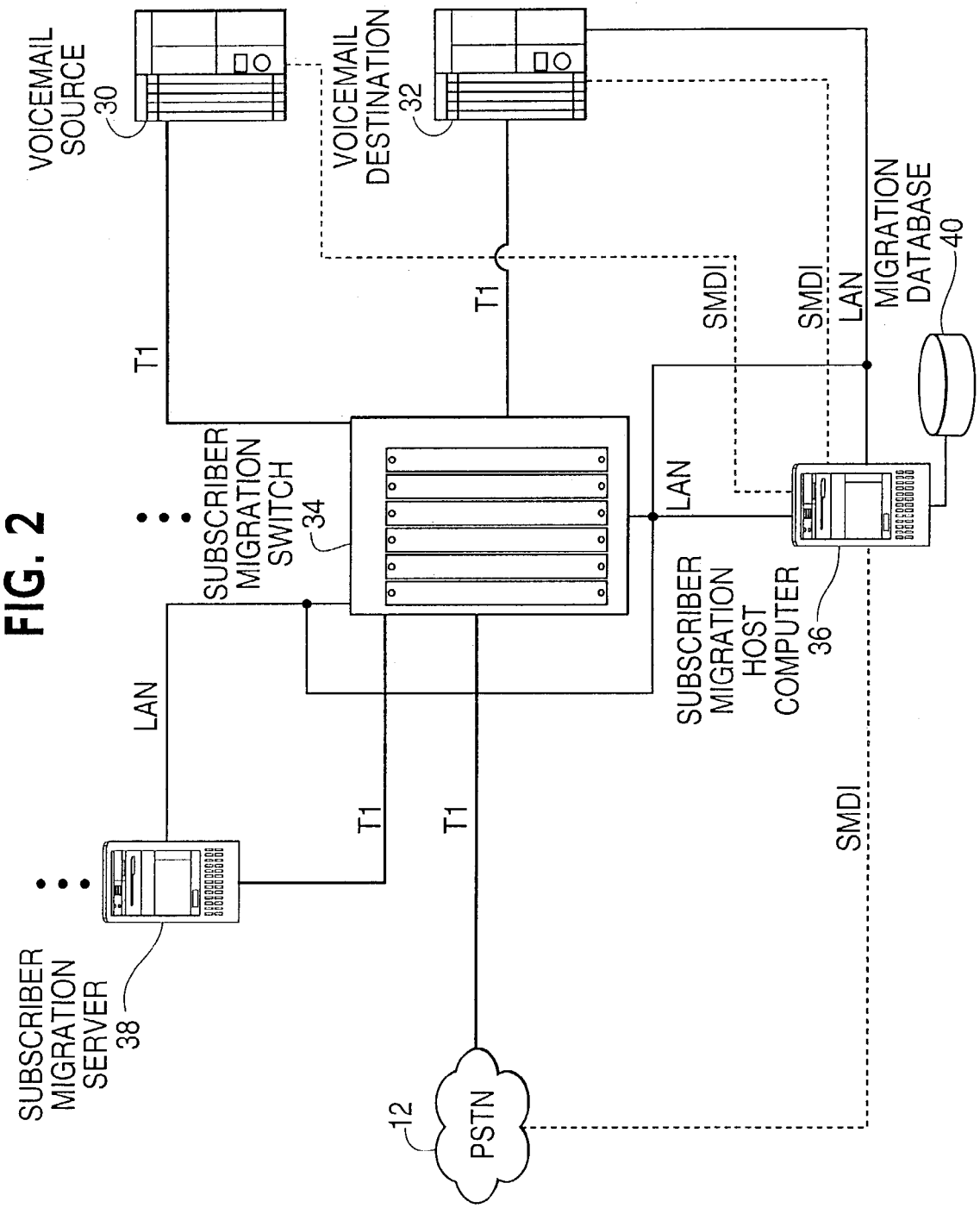
FIG. 2 depicts the components of the present invention.

The present invention provides a seamless migration for a source voicemail system 30 to a destination voicemail system 32 using three components: a subscriber migration switch (FES) 34, a subscriber migration host computer (HC) 36 and a subscriber migration server (SMS) 38, as depicted in FIG. 2. A typical migration starts with the sending of a migration request identifying a subscriber from the host 36 to the server 38. The server 38 seizes a line to the switch 34 and the host 36 controls the switch 34 to provide a voice connection between the server 38 and the source 30. The server 38 accesses the subscriber's mailbox on the source 30 through the switch 34 and records the messages stored in the mailbox along with message attribute information, such as the time of the message, etc. Once the recording is complete, the recorded messages, etc. are sent by the server 38 to the destination system 32 over a local area network (LAN) connecting the components. The server 38 then informs the host 36 and a migration database 40 listing subscribers to be migrated, being migrated and that have been migrated is updated. The migration discussed briefly above will be described in more detail later herein.

During a migration, messages are stored in the migration server and transferred as audio files or information while the attribute information determined from "listening" to the audio with ASR is transferred as digital data files or information.

What follows first is a description of each component. While each of the components is described in the singular for illustrative purposes, there can be multiple instances of any of the components depending on the size of the migration to be performed.

For signaling, the subscriber migration service is described using T1/SMDI—which is the standard for North America residential voicemail service. However, the methods that are described are applicable to any signaling interface (signaling system 7—SS7, Primary Rate Interface—PRI, voice over IP—VoIP, etc.)—or even combinations of signaling interfaces. For example, the source system 30 may only support T1/SMDI—but the destination system may be SS7 based.

The source system 30 is the original voicemail system that contains the subscriber information (greetings, name announcement, PIN, messages, etc.). Subscribers are migrated from the source system 30 to the destination system 32. The source system 30—prior to migration—has direct connections to the PSTN via T1/SMDI.

The destination system 32 is the new voicemail system that has been installed. During subscriber migration, it has an internet protocol (IP) connection to the other components of the subscriber migration service (except the source system 30). Furthermore, subscriber migration may require that the destination system 32 be pre-provisioned with the subscriber mailbox numbers, class of service, and other features that can be determined from the provisioning interface of the source system 30. The destination system 32 has the ability to receive subscriber greetings, messages, message attributes, name announcement, PIN, etc. via the IP interface.

The subscriber migration switch 34 is the "front-end" switch that interconnects (via T1) the PSTN 12 with the source system 30 and the destination system 32. It also has one or more T1 connections from the subscriber migration server 38. It also has a LAN connection to the host computer 36. The switch 34 is preferably a switch manufactured by Lucent Technologies, such as the preferred EXS series Programmable Switch.

The subscriber migration host computer (HC) is the host computer that controls the front-end switch 34. It may control multiple switches, depending on capacity needs. The host computer 36 maintains the subscriber migration database 40. The host computer 36 issues requests to the subscriber migration server 38 to migrate individual subscribers and/or messages from the source system 30 to the destination system 32. The host computer 36 also preferably maintains the SMDI connections to the PSTN 12, the source system 30, and the destination system 32. The host computer 36 acts as an SMDI router in deciding which SMDI call arrival packets from the PSTN are directed to which system based on the status of the mailboxes in the migration database 40. The host computer 36 also uses the migration database 40 to determine which SMDI message-waiting packets from the systems are forwarded on to the PSTN 12. The host 36 is preferably a server class computer although a desktop class computer can be used. The host 36 can optionally have a display for displaying a status of the migration operations.

The subscriber migration server (SMS) is preferably a personal or server computer class machine preferably configured with NMS T1 voice cards available from NMS Communications of Massachusetts, Microsoft Windows 2000 available from Microsoft Corporation of Washington, and Nuance 8.0 Speech Recognition software available from Nuance Communications of California. The subscriber migration server 38 accepts requests via hypertext transmission protocol (HTTP) and possibly other protocols from the host computer 36 to migrate individual subscriber information and/or messages from the source system 30 to the destination system 32. The subscriber migration server 38 has one or more T1 connections to the front-end switch 34 so it can be connected via the telephony talk path to the source system 30. The subscriber migration server 38 has IP connectivity to the destination system 32, so that it can submit the information for each subscriber that it has retrieved from the source system 30. The server 38 can optionally have a display for displaying a status of the migration operations.

Prior to a discussion of call flow and migration within the present invention, there are a few areas of operational processing that need to be described to support the more detailed description of seamless subscriber migration described in later herein. Each area is explained in detail below.

The present invention uses conventional automated speech recognition (ASR) for reliable message detection. Speaker independent ASR is preferred although speaker dependent could be used. While it is possible to use dual tone multi-frequency (DTMF) signaling to navigate the call tree of a voicemail platform (indeed, every currently deployed platform requires it), it is not practical, just with DTMF, to detect when the source system 30 begins message playback or when a message has completed playing. Source systems 30 typically play the message envelope (urgent/new/saved, date/time of arrival, and message number) immediately prior to playing the message body. Furthermore, most source systems 30 also play a "message menu" immediately after playing the message body. Subscriber migration in the present invention preferably uses conventional ASR "hot word" feature to determine when the message menu has begun playback, and uses the hot word feature in trimming the appropriate amount of recorded speech from the end of the message. For example, the message may end with the phrase, "To repeat this message, press one." The hot word that the system would look for is this word sequence. The location of this phrase within the audio recording is used for trimming. The detection of this phrase in a word stream by the automated speech recognition engine allows the end of the new message to be designated in the stream immediately before this hot word phrase. When searching for the beginning of the message, the recorded message is used after the end of the message has already been found. This allows the message envelope to be read by conventional ASR repeatedly so that a complex message can be recognized correctly. For example, a message envelope may say "First new message, received today at one PM." In this case, the recognizer is best configured to recognize a five second message. The envelope can be longer; as in the example, "Twenty second saved message, received Tuesday, August tenth at seven thirty AM." For this longer example, the recognizer is best configured to recognize a nine second message. Several recognition attempts can be made with the same recording to find the best recognition result. The best result is used to determine the value of the message attributes (urgent/new/saved, date/time of arrival, and message number) and how much of the beginning of the message should be trimmed. The message attributes are stored as data elements in the destination system 32 after the server 38 determines them.

This application of ASR technology can also be used to determine and migrate other voice application features, such as reminders, family mailboxes, group lists, etc.

The present invention uses the front-end switch 34 during the migration process to reduce the cost of the deployment of a new system. It is important for carriers to minimize the cost of migration. By using the switch, the carrier need not duplicate the number of facilities (T1/SMDI) from each end office to the destination system 32. The front-end switch 34 allows the carrier to install the subscriber migration hardware of the present invention (34, 36, 38 and 40) during the maintenance window, and as fast as desired, for example slowly over a period of days, weeks, or months, migrate the subscribers from the source system 30 to the destination system 32. After the migration is complete, the facilities can be removed from the front-end switch 34 and terminated directly onto the destination system 32.

The present invention allows migration of the subscribers from the source 30 to the destination 32 over a period of time and during that period the present invention merges the outgoing MWI streams. Since both the source 30 and destination 32 will need to manage MWI for their respective pieces of the subscriber pool during the migration, it is important to merge the MWI data streams from both systems and present one stream to the PSTN 12. Furthermore, the source system 30 may issue MWI on/off for subscribers that have already been moved to the destination system 32, and it is important to block the MWI, as the source system 30 is no longer the authority for those subscribers. MWI-off for a migrated subscriber from the source system 30 can occur based on a system function being executed in the legacy system when the subscriber mailbox is deleted, or when all the messages expire. MWI-on for a migrated subscriber can occur if the system supports mailbox-to-mailbox addressing (and the sending mailbox is still on the source system 30). In this case, an MWI-on command from the source system 30 is used to trigger an immediate message migration from the source 30 to the destination 32—so the migrated subscriber doesn't lose messages that may have been left on the source system 30 after migration has occurred.

The present invention uses a digit collector in the front-end switch 34 to capture the subscriber's PIN or pass code. One of the puzzles of subscriber migration is how to determine the subscriber's PIN—since many source systems encrypt the PIN in their respective database. Fortunately, the front-end switch 34 has the ability to assign a DTMF digit collector on the talk path from the caller, and this can be used to "sniff" or record the PIN from the resulting DTMF digit stream. Some systems (most notably wireless systems) have a feature known as "pass code skip", which does not require the subscriber to enter a PIN if they are calling from their "home phone". In this case, the PIN cannot be captured—however the migration can still occur (by presenting the call from the subscriber migration server 38 as one that is coming from the subscriber's "home telephone"). In such a situation the destination system 32, because the new system will not have the subscribers PIN stored therein, may have to prompt the caller (presumably when the caller uses something other than their home telephone for retrieval) for other identifying information and lead the caller through the process of choosing a new PIN.

After a migration is completed for all of the subscribers that can be migrated automatically, and after some predetermined period of time (presumably up to 30 days), there may still be subscribers on the source system 30 that have not called in to retrieve messages. For these subscribers, the carrier should reset their PIN on the source system 30 to a known value—and populate the subscriber migration database accordingly. The migration of these subscribers can then be rapidly effected using the reset PIN. For these subscribers, a similar procedure to the "pass code skip" PIN recovery is required the first time they call the destination system 32.

It is possible for a subscriber that has been migrated to call to retrieve a message from a neighbor's phone that has yet to be migrated. In this scenario, the call is switched or routed to the source system 30 (because of the ANI for the neighbor's phone). However, it is important that the subscriber's attempt to log in to their old mailbox fail—because they will be very confused about the state of their mailbox and messages. To guard against this possibility and to ensure login failure on the source system 30 when a subscriber has been migrated, the subscriber migration service modifies the subscriber's PIN in the source system 30 preferably as the last step during the migration. The PIN is preferably modified in an algorithmic manner so that it can be undone in case the subscriber migration procedure is aborted and the source system 30 needs to be restored. The front-end switch 34 can switch the call from the source system 30 to the destination system 32 after it detects that the caller has input the mailbox number of a subscriber that has already been migrated to the destination system, thus allowing subscribers to retrieve their messages in this situation.

The present invention also manages the load on the source system 30 caused by the migration process. Because all of the T1 lines for the source system 30 are routed through the front-end switch 34 and the host computer 36 controls the switch 34, the host computer 36 has complete knowledge of how much call load the source system 30 is experiencing. The host computer 36 uses this knowledge to determine how many subscriber migration server calls to permit on the source system 30. Typically at least one-half of the ports on the source system can be used for migration. A system administrator typically configures the host computer as to which hours are the "least busy" hours for the source system 30, and for how many simultaneous calls to permit for the subscriber migration process. Furthermore, the host computer 36 examines the call load that the source system 30 is experiencing from the PSTN 12 through the switch 34 and the load caused by current migration operations, and forces the subscriber migration process to wait if the call load exceeds configured thresholds by not making additional requests for migration.

Figure 3:
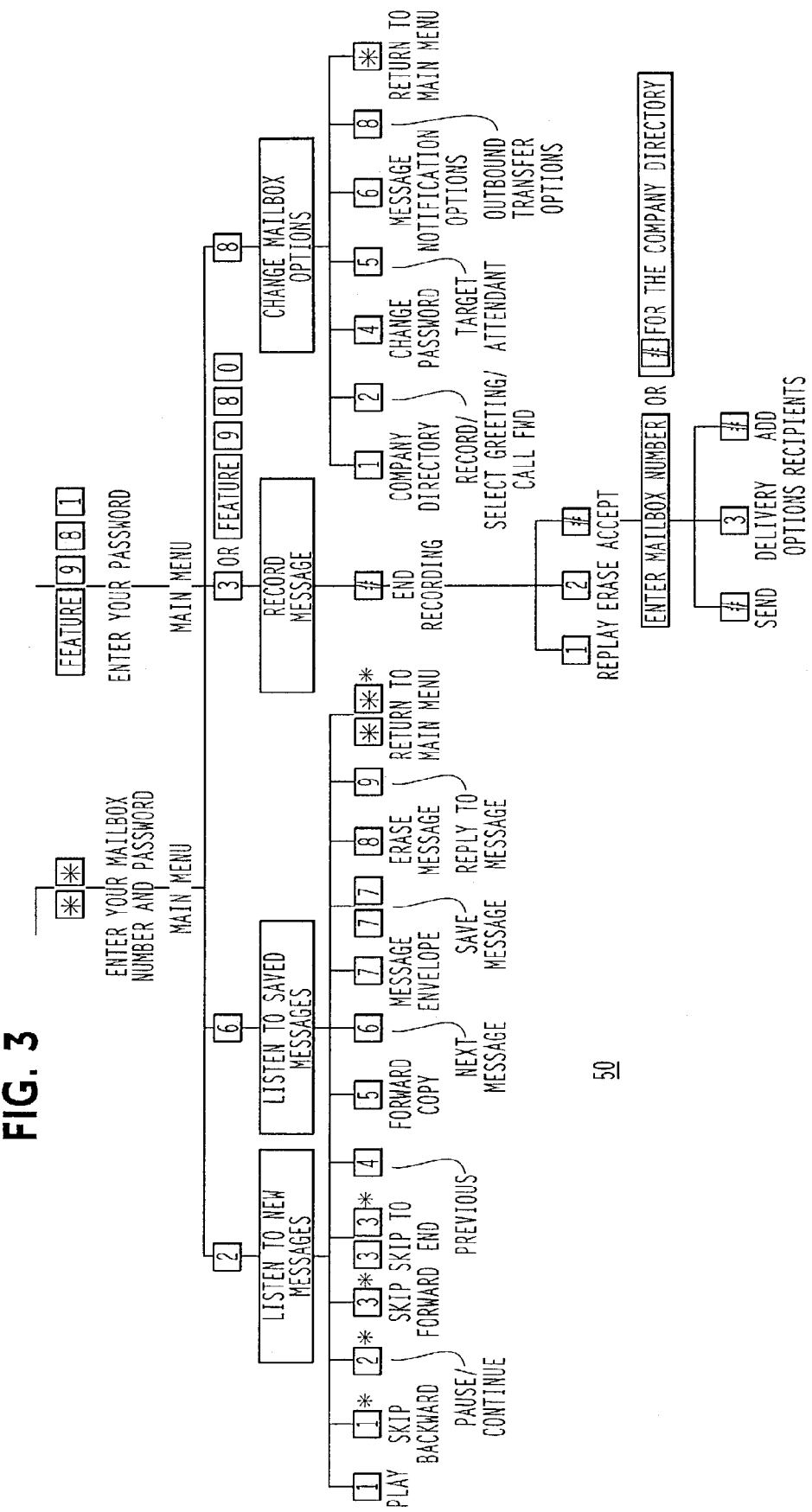
FIG. 3 illustrates a menu structure of a voicemail system.

Because the present invention obtains the voice messages through the voice interface of the source system 30, the migration process needs to be able to navigate the menu structure of the source system 30. A call tree menu structure 50, such as depicted in FIG. 3 including the digits needed to navigate the system, can be obtained from the carrier that owns the source system 30 or it can be determined by an individual navigating the menu. This structure 50 can be used by those of skill in the art to create a program that will navigate the menu in a desired order as discussed later herein to allow the messages stored in the SS 30 to be played, etc.

Prior to performing a subscriber migration, the various servers need to be installed and provisioned. The destination system 32 must be installed and fully functioning. It needs to be provisioned with the mailbox numbers for all of the subscribers that will be migrated from the source system 30. The provisioning can be a pre-provisioning so that class of service and other information can be considered or the mailboxes can be provisioned at the time of the migration. To maintain a seamless migration, the mailbox numbers in the destination 32 need to be provisioned with the same feature set (at a minimum) available to the subscriber on the source system 30, including the same amount (or more) of mailbox storage as well as maximum permitted length of messages.

Preferably, after the destination system 32 is known to be working, the front-end switch 34 and the subscriber migration host computer 36 are installed. Typically, the equipment is co-located with the source 30 and destination 32 systems—but remote IP and telephony connectivity are possible, if needed.

Preferably during a maintenance window for the source system, all of the PSTN lines (T1 and SMDI) are moved to the front-end switch 34 and host 36, with corresponding lines coming from the front-end switch 34 and host computer 36 to the source system 30. At this point, all calls placed to the MLHG of the source system 30 will be routed through the front-end switch 34 before terminating on the source system 30 for service. All features of the source 30 should be verified at this point to insure that the system is functioning prior to the beginning of subscriber migration.

Before migration starts, test mailboxes should be provisioned on the source system 30 and known to be working. There should be a mailbox for each class of service (COS) available on the source system 30. The test mailboxes, after they are provisioned, are registered in the database 40 for the subscriber migration host computer 36. Additionally, the subscriber migration server 38 should verify its telephony connectivity to the source system 30, as well as IP connectivity to the destination 32 and other components. Test calls should then be made into each of the test mailboxes. The administrator should verify that the test calls have completed properly, and that the migration server 38 is or has been able to migrate the test mailboxes from the source system 30 to the destination system 32. Once the test migration is complete and is known to be working properly, the administrator may then add all of the desired mailboxes that need to be migrated to the host computer database 40. The migration can be in any order. However, a migration order, such as an order determined by the number of messages stored in each mailbox, can be used where the number of messages stored in each mailbox can be determined by the number of MWIs sent by the source system.

Figure 4:
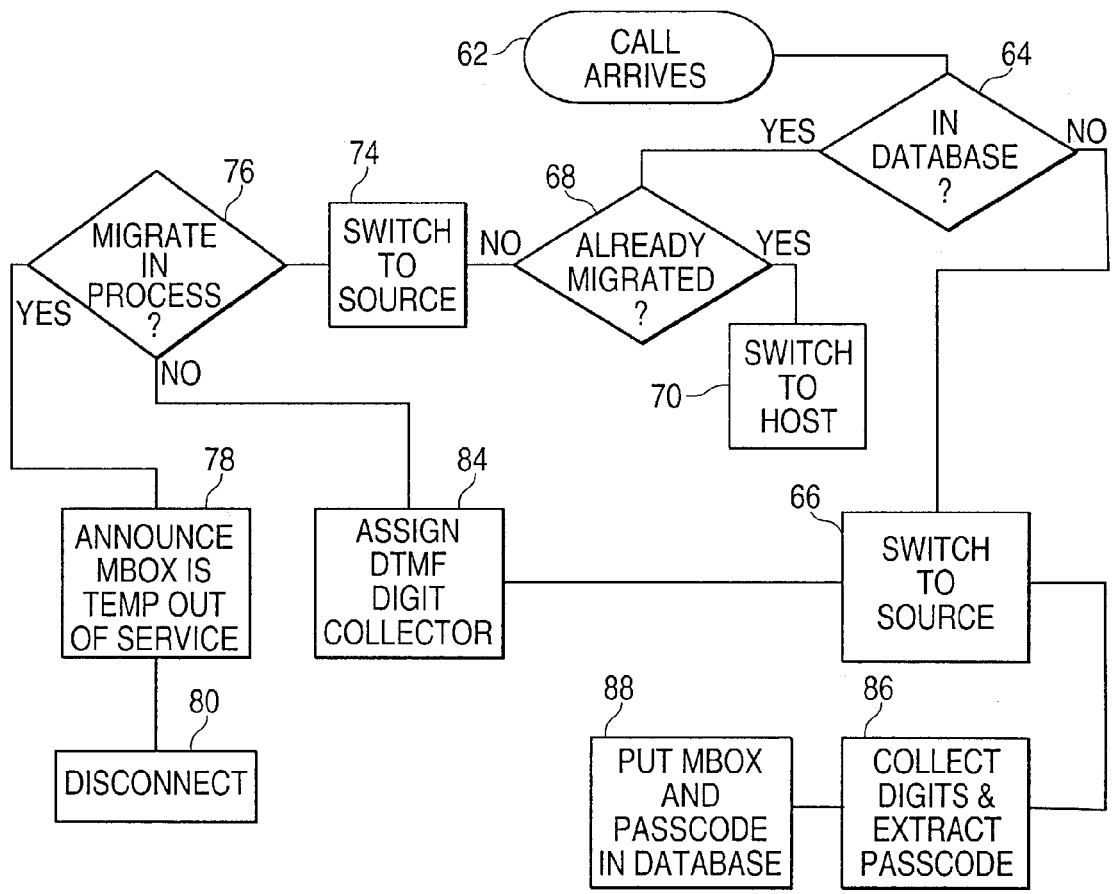
FIG. 4 depicts a pass code capture process of the present invention.

Once all of the set-up operations have been completed, the migration process can start. The first operation involves collecting the pass codes or PINs of the subscribers. As depicted in FIG. 4, upon receipt of a request for service (RFS) from the PSTN 12 on the front-end switch (FES) 34, the host computer (HC) 36 awaits the corresponding SMDI packet coming over the SMDI link(s) which together constitute a compete call arrival 62. Once the RFS and SMDI have both been received, the HC 36 examines 64 the SMDI packet for the subscriber number (SN), and looks up the number in the subscriber migration database (DB) 40. If the SN is not in the database, the HC 36 routes 66 the call to the source system (SS) 30. If the SN is in the database 40, the HC 36 determines 68 whether the subscriber's mailbox is on the SS 30 or destination system (DS) 32, and routes the call appropriately 70 or 74. If the subscriber is currently in the process of being migrated 76, the HC 36 directs the FES 34 to play 78 a "mailbox currently unavailable" prompt and releases 80 the call. If the subscriber has not been migrated, the HC 36 instructs 84 the FES 34 to attach a DTMF digit collector on the talk path from the caller and routes 66 the call to the source 30. The PIN is collected even if it has already been collected to cover a situation where the PIN has been changed since the initial collection of the PIN. The HC 36 receives the collected digits from the switch 34 and then examines 86 the resulting DTMF digit sequence to determine if a subscriber is logging in, and determines the subscriber's numeric PIN. Once the HC 36 determines the PIN, it associates 88 this information with the SN in the DB 40 for later use. The HC 36 also updates the database 40 to indicate that the subscriber is logged-in. Once the PIN is captured the mailbox can be migrated.

Figure 5:
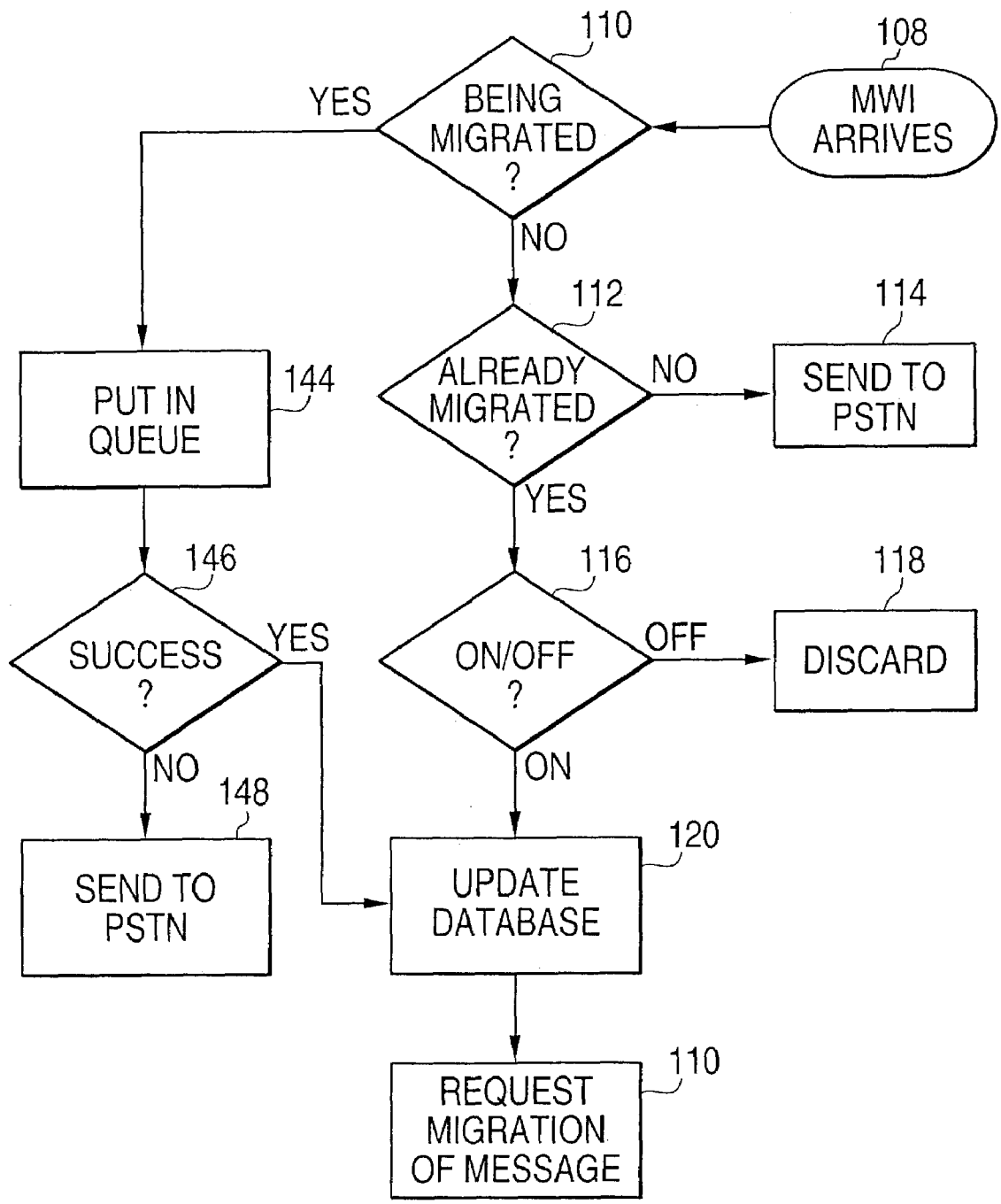
FIG. 5 depicts MWI handling.

Upon receipt 108 of an SMDI/MWI packet from the SS 30, as depicted in FIG. 5, the HC 36 determines 110 if the mailbox is being migrated. If not, the HC 36 determines 112 if the SN has already been migrated to the DS 32. If the subscriber number (SN) is still on the SS 30, then the MWI is permitted to go 114 out to the PSTN 12. If the SN is on the DS 32, then the HC 36 determines 116 if it is an MWI-on or MWI-off command. If it is MWI-off, then the HC discards 118 the packet. If it is an MWI-on, then the HC 36 updates 120 the information for the SN in the DB 40, and requests 122 the subscriber migration server (SMS) 38 to retrieve the message from the SS 30 and migrate it to the DS 32 as soon as possible.

The system allows a caller to leave a message for a subscriber for which the mailbox is being migrated. If an SMDI MWI-on packet comes from the source system (SS) 30 during the time when a subscriber is being migrated 110 to the DS 32 indicating that a message has been saved during migration, then the HC 36 puts 144 the MWI packet in a "hold off" queue, waiting for the result of the migration operation for this particular subscriber. If the subscriber is successfully migrated 146, then the HC 36 treats the MWI-on packet as if it arrived after migration had completed and processes the packet as stated above. If the subscriber migration for this subscriber has an error, or is aborted, then the HC 36 sends 148 the queued MWI-on packet from the SS 30 to the PSTN 12.

When the configured "least busy" hour range begins 170, as depicted in FIG. 6, the HC 36 examines the database (DB) 40 for SN's (mailboxes) that have corresponding captured PINs, but have yet to be migrated to the DS 32 and selects 172 one or more mailboxes to migrate. The HC 36 checks 174 to see if the subscriber is currently logged into the SS 30 (by examining the DB 40), and if so skips the subscriber and marks 176 the subscriber for a future migration after an appropriate waiting period has elapsed. Otherwise, the HC 36 issues 178 a request to the SMS 38 to migrate a particular subscriber. The request contains all of the pertinent information for the SN (PIN, feature set, etc.) that is known. The SMS 38 accepts the request and begins processing it. While the migration server (SMS) 38 is processing the request, the host computer (HC) 36 may send additional requests until either the SMS 38 has met its limit on the number of simultaneous calls, or the SS 30 has met its limit on the amount of load that is permitted for subscriber migration calls. The HC 36 also instructs 180 the switch 34 to watch for a line seizure from the server 38 and switch 182 the call to an available port on the source system 30.

If the source system becomes overloaded such as the number of additional calls exceed a predefined limit, the host computer 36 can cause one or more migrations in progress to be aborted. In such as situation the HC 36 preferably would abort migrations that were started most recently. In addition, it is possible for a race condition to occur by selecting the mailbox, testing whether the subscriber is logged in and later marking the mailbox as "currently unavailable." As an alternative, the mailbox could be marked as "currently unavailable" when it is selected, then a test performed to determine whether the subscriber is logged in and proceed from there (if the subscriber was logged in, then restore the flag to indicate the mailbox is still available in the source system 30).

When the SMS 38 begins the migration, the HC 36 updates the SN in the DB 40 to mark the SN as "currently unavailable". This is to prevent the subscriber from attempting to retrieve messages while the migration for the account is occurring. After the migration of the subscriber is complete, the SMS 38 modifies the PIN for the SN on the SS 30, and updates the HC 36 with the new PIN information for the source system 30. This is done to prevent the subscriber from being able to log into the source 30 after the mailbox has already been migrated (which can happen under certain race conditions if the subscriber uses a neighbor's phone).

As each SMS migration call completes, the host 36 sends another request to the SMS 38 for another migration, if a) there are still additional migrations to perform, b) if it is still during the "least busy" hour range window, and c) if the SS 30 has sufficient capacity to accept the call load from the migration server 38.

Upon receipt of an RFS from either the SS 30 or the destination system (DS) 32 (which can happen if the SS 30 or DS 32 wants to place an outgoing call, for features like pager notification), the HC 36 instructs the FES 34 to route the call to the corresponding line for the PSTN 12.

Upon receipt of an RFS from the SMS 38, the HC 36 directs the FES 34 to connect the channel to one of the available incoming channels for the SS 30. This is the start of the migration for a particular subscriber or message.

Figure 7A:
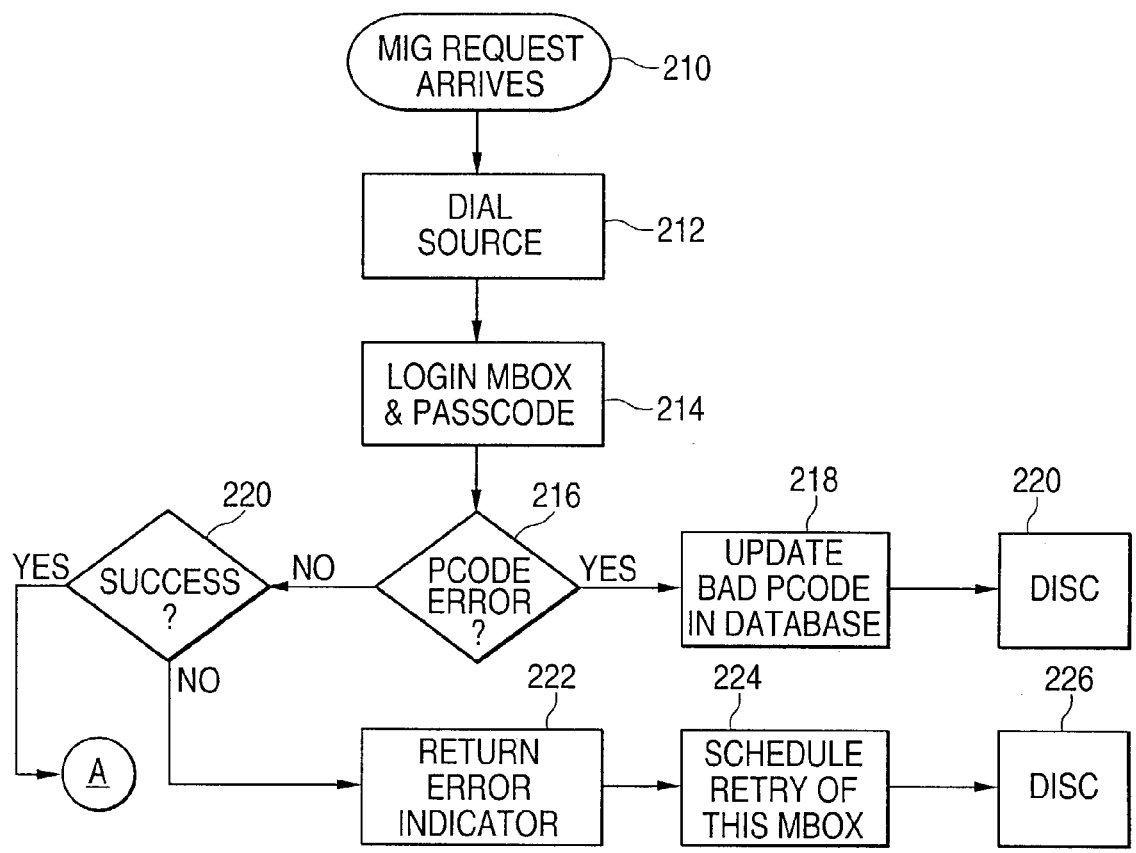

In the migration call flow, as depicted in FIGS. 7A and 7B, upon receipt 210 of a migration request (MREQ) from the HC 36, the SMS 38 outseizes 212 on a line, thus signaling the FES 34 and HC 36 to connect the channel to an available incoming channel for the SS 30. Also, the SMS 38 requests the HC 36 to send the corresponding SMDI call arrival packet, including the ANI, to the SS 30 based on the SN for the subscriber that is being migrated. It is also possible for the SMS 38 to use in-band signaling to indicate the identification of the incoming call as from a subscriber.

The SMS 38 then listens on the talk path from the SS 30. The SMS 38, over the talk path to the source 30, outputs 214—via DTMF—the PIN for the subscriber that it received in the MREQ. The SMS 38 also activates the "main menu" grammar detector, as well as the "invalid pass code" grammar detector of the ASR, and waits for recognition results. If the "invalid pass code" prompt is recognized 216, then the SMS 38 notifies 218 the HC 36 that the PIN is incorrect, and the HC 36 clears the PIN for the SN in the DB 40. The server 38 then terminates the call. The HC 36 will reattempt this subscriber number (SN) once the subscriber logs in again via the SS 30 and the PIN is again collected. If neither prompt is recognized 220, then the SMS 38 returns 222 a failure indication to the HC 36, which will note the failure, requests 224 scheduling of a retry and reattempt of the migration for this subscriber after an appropriate waiting period has elapsed and disconnects 226.

Assuming the SMS 38 recognizes the "main menu" prompt (see FIG. 7B), the server 38 then out pulses 228 the DTMF key for listening to messages. In the example of FIG. 3 the key output is the number "2". The SMS 38 also activates the grammar for the "end of message" prompt. The SMS 38 also begins 230 digitally recording the audio that is coming back from the SS 30 and storing it in a data file that corresponds to the current message number.

After receiving the "end of message" recognition from the ASR process, the SMS 38 stops the recording audio process, and trims 232 the end of the message file so the "end of message" prompt is removed. The trimming is typically just before the "end of message" prompt however, it is also possible to trim the message at the end of the utterance coming just before the prompt. The SMS 38 also performs 234 the speech recognition operation on the recording. If the grammar detector does not detect 236 the "end of all messages" prompt, the SMS 38 activates 238 the grammar for message attribute detection (urgent/new/saved) as well as for 240 the date and time detection, and provides the recognizer with the recorded message file as the source of the audio allowing the recognizer to go back through the recorded message looking for attributes and the end of the envelope. Note that the system of the present invention may have to navigate the prompt tree to obtain message attribute audio for systems that do not play such information with the message. Upon receipt of the recognition results for urgent/new/saved and date & time, the SMS 38 associates this information with the corresponding data file for the message, and trims 242 the message envelope information from the beginning of the message audio file. The trimming of the recording leader involves finding the last utterance of the envelope and discarding the part of the recording that includes the envelope. The server 38 then outputs 246 the DTMF for the next message. Note that the attribute information can be determined for the messages while the next message is being recorded or even after all the messages of the mailbox have been recorded.

The SMS 38 continues through all of the messages in this manner, until the "main menu" or "end of all messages" grammar is recognized again—thus signaling the end of the message queue.

The SMS 38 follows a similar process for recording 248 the greeting(s) for the subscriber (by navigating via DTMF to the "greeting review" menu)—and similarly for recording 250 the name announcement for the subscriber. Finally, the SMS 38 modifies 252 the PIN for the subscriber on the SS 30 via the corresponding menu over the telephony user interface and disconnects 254.

At the completion of this process, the SMS 38 submits all of the information (messages, attributes, greeting(s), name announcement, PIN, etc.) to the destination system (DS) 32 that corresponds to this subscriber number (SN). Preferably the information is submitted via a protocol, such as HTTP, in a format, such as the XML (extensible Mark-up Language) which includes DTD (Document Type Definition) and XSL (extensible Style Language), allowing data submission independent of the new system's API. An example of an information transfer is discussed below. Upon positive acknowledgement from the DS 32 that the SN has been updated, the SMS 38 updates the DB 40 on the HC 36 for this particular SN that the migration is complete.

In the present invention, the XML API preferably includes an HTTP POST that includes multipurpose internet mail extensions (MIME) encoded form data. The first MIME part in the post is an XML snippet that identifies the mailbox and the audio being migrated (greeting, name and any number of message audio IDs). The audio data corresponding to each of these follows in other MIME parts in the post.

In the example below there is a greeting and name announcement in addition to two messages. Therefore, the post would include 5 MIME parts: the XML snippet will be the first part, followed by the audio data in 4 MIME parts. The audio data is identified by the ID specified in the XML snippet.

In the case of family mailboxes, there would be multiple sets of data like the one above. One set for the primary mailbox and other sets for each of the sub mailboxes. For the non-primary mailbox sets (i.e., the sub mailboxes), the subscriber ID would include the sub mailbox identifier, for example "6178643011s1" for the first sub mailbox.

Note that an <append> tag will be present for the subscriber if these messages are to be appended to the current mailbox. This tag is directly related to the special case discussed above where an MWI-on message arrives from the source system for a subscriber that has already been migrated. In that case the migration server 38 would be requested to "get" the new message. In the HTTP post generated from this request, the <append> tag would be present in the XML snippet (it is shown in the example below).

XML SNIPPET

```
<?xml version="1.0" ?>
<subscriber id="6178643011">
    <pin>1234</pin>
    <greeting audio-id="greeting-id"/>
    <name audio-id="name-id"/>
    <append/>
    <mailbox>
        <message audio-id="audio-1-id">
            <envelope>
                <sender>9783694112</sender>
                <urgent>0</urgent>
                <new>0</new>
                <private>0</private>
                <return-receipt>0</return-receipt>
                <arrived>2002-08-05 18:25</arrived>
                <expiry>2002-04-28 07:36</expiry>
            </envelope>
        </message>
        <message audio-id="audio-2-id">
            <envelope>
                <sender>9788359704</sender>
                <urgent>1</urgent>
                <new>1</new>
                <private>1</private>
                <return-receipt>1</return-receipt>
                <arrived>2001-10-01 13:20</arrived>
                <expiry>2001-12-31 01:25</expiry>
            </envelope>
        </message>
    </mailbox>
</subscriber>
```

Figure 8:
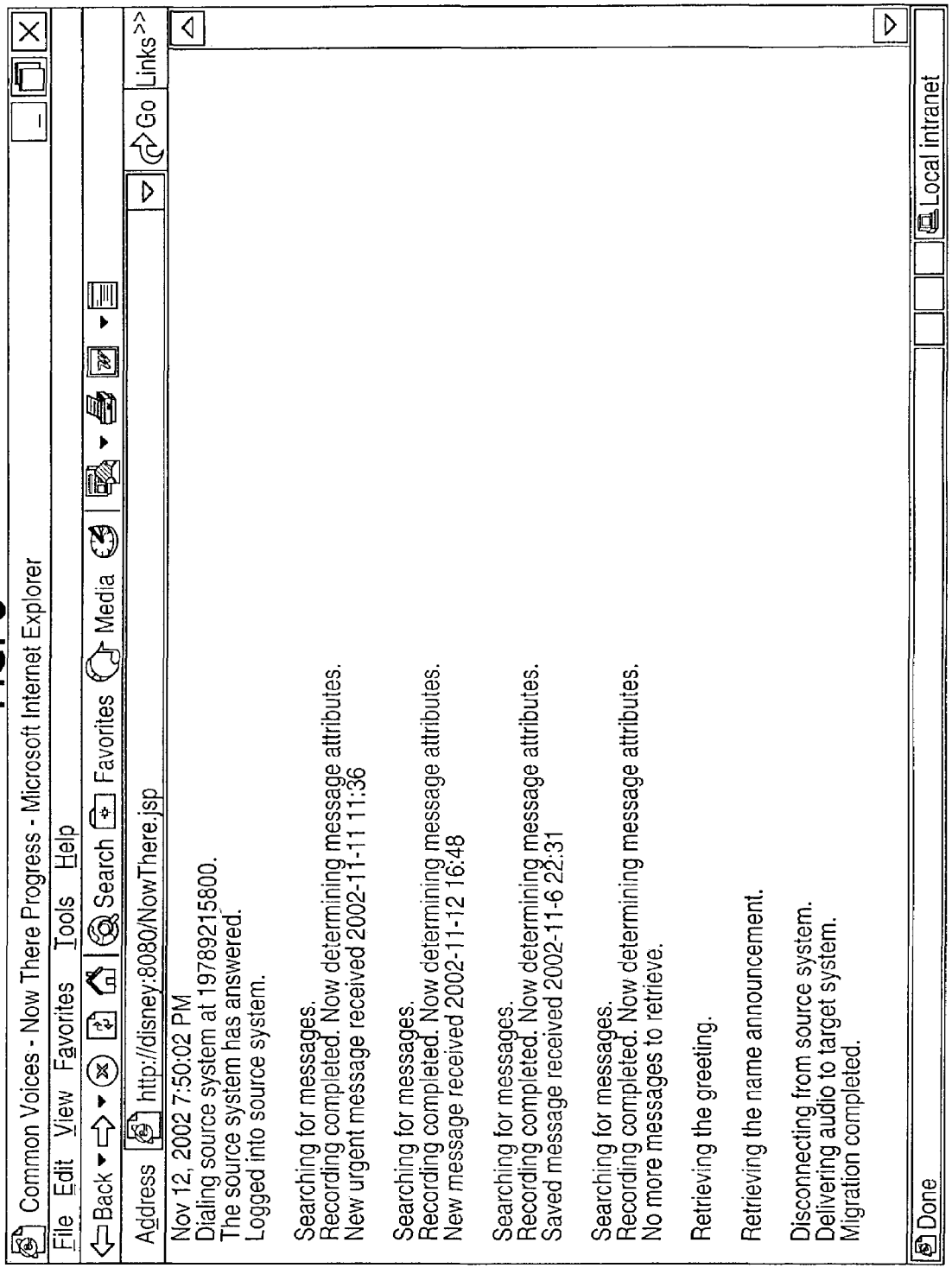
FIG. 8 illustrates a migration status display.

During the migration operation, it is possible to have the server 38 or the host computer 36 produce a migration status display, as depicted in FIG. 8, that can be displayed on the displays of these computers or sent via an IP communication to a computer of an administrator for display thereon. This display shows the status of: the connection to the source, the log-in, the search for messages, the recording of the messages, the message attribute collection, the type of message, the time/date of the message, the end of the messages, the retrieving of the greeting, retrieving of the name announcement, and delivery of the mailbox contents to the destination system.

Figure 9:
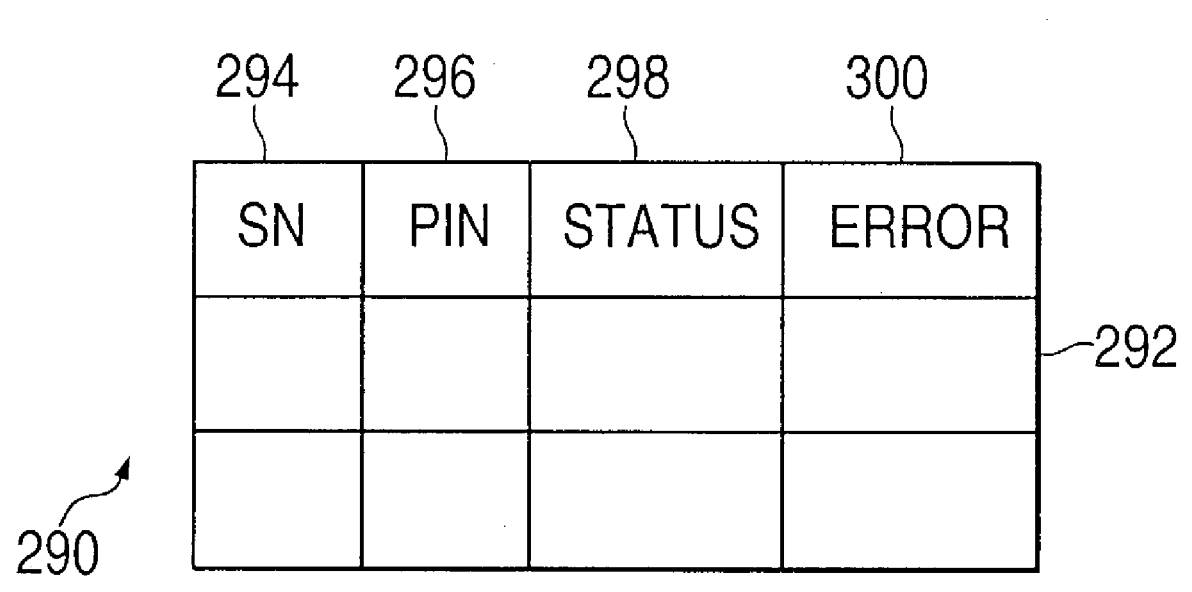

The present invention stores information about the mailbox and the migration status in the storage of the server 38 and the host 36. This subscriber information includes: subscriber number or mailbox identifier, PIN, migration status, attributes of the messages, messages, subscriber greeting, subscriber name announcement, dialed number information service (DNIS) of the source voicemail application, the time of the last successful migration, the source system ID, the destination system ID, the number of family mailboxes, the family mailbox PINs, logged-in flag, source system class of service (COS), destination system class of service (COS), language of the account on the source system, and next scheduled migration date and time. This information can be stored in a data structure, such as a list data structure. For example, as depicted in FIG. 9, the DB 40 could include a list 290 of subscriber records 292 where each record includes fields for SN 294, PIN 296, status (migrated, not-migrated, in-progress) 298, error status 298, etc. (with the fields for the other information noted above being not shown for brevity). A similar list data structure can be used to contain information related to migrated messages and includes records having fields for subscriber ID (or SN), message number, message sender, message state (new, save, urgent), date and time of message and message duration (approximate). The data need not be stored in list structures but could be in other types of structures, such as an array.

Because the present invention includes the switching system, a seamless migration is possible where the user need not be presented with a special prompt during or after migration.

Once the migration is "completed" (where some mailboxes cannot be migrated because of a special configuration/feature) and before the present invention is removed from the network, the source system needs to have the mailboxes purged from it to avoid the production of erroneous MWI-off messages for a subscriber that is no longer on the system.

The present invention could also assign a digit collector to calls to the destination system for mailboxes that have been migrated for situations where the subscriber calls from a neighbor's house and the neighbor has been migrated but the subscriber has not been migrated. The digit collection could be used to reroute the call to the source system, to collect the subscriber's PIN or to play a message that the system is temporarily out of service.

Typically, the system does not release the connection to the source for a particular mailbox and set the migration status as successful or change the PIN until the destination acknowledges receipt of the migration information. Of course, if a time-out occurs while waiting for the acknowledgement, the migration is designated as failed and a retry is scheduled.

The system also keeps a failure count and a failure code/description to inform the system administrator about failures. The failure information can also indicate the source port on which the failure occurred.

The system needs to know information about any special configuration for the mailbox, such as whether it is a family mailbox with multiple PINs. There are several ways in which to determine the number of sub-mailboxes: the data can be retrieved through an administrative interface or if the main mailbox PIN is known, the migration can use ASR to determine the number sub-mailboxes. The system navigates such special mailboxes during a call flow in substantially the same way as for a non-family mailbox using a family call tree but must wait for all of the PINs of the sub-mailboxes to be collected before migration can be started.

The present invention can obtain the mailbox information from the source system and send the mailbox information to the destination system via any public interface including a data interface, a voice interface and or a web interface.

The call tree used to navigate the source system could be discovered by an automatic process using ASR and DTMF to navigate the menu.

It is possible to migrate mailboxes in a system with a limited number of subscribers who can be migrated in a maintenance interval without using the switching system. Such a migration involves attaching digit collectors to the existing telephony interface of the source system to capture the pass codes of the subscribers. Once the pass codes are captured, the facilities would be switched to the migration server and the migration would be performed in the maintenance window after which the facilities would be switched to the destination system.

It is also possible to accelerate the migration by using the capabilities of some source systems to skip prompts. However, this may require sacrificing the collection of message attribute information.

The system of the present invention can also use speaker differentiation detection where the system detects the difference in the voice of the prompts and the messages to determine the beginning and ending of a message in an audio stream and to detect prompts. The system of present invention can use known maximum message lengths to assist in navigation. The system of present invention can also use ASR that can distinguish between languages when migrating from a multilingual system. The system of present invention can further use a network sniffer to detect the pass code should the source system transmit the pass code over a data network. The pass code can also be obtained via a report from the source system or via a web access sniffer operation when access to a mailbox over the Internet is allowed.

The present invention has been described with respect to storing a message in the destination system via a data transfer to the destination system through an IP interface, such as a LAN connection. It is possible to store a message in the destination system by accessing the destination system through the voice interface using a predetermined pass code and the subscriber number, save the message into the destination system by playing the recorded message through the voice interface as a new message and change the pass code or PIN to that of the subscriber. In this situation the envelope information, such as the date and time the message was saved will be inaccurate unless the destination system supports a mechanism allowing setting of envelope information through the voice interface.

The present invention has been described with respect to migration of voice messages. However, the present invention can be used to migrate other advanced features, such as "reminder", "wake-up", special delivery, paging, etc. For example, for a paging message or a special delivery message the system of the present invention can record the message and move it to the destination system where it would be deposited in the appropriate queue triggering special processing in the destination system and then navigate the menu to deactivate that feature on the source system.

The present invention has been described with respect to voicemail. However, the present invention can be used to migrate an automated attendant application from one system to another.

The present invention has been described with respect to the tasks for a mailbox being performed sequentially. However, it is possible for tasks to be performed in parallel. For example, a mailbox greeting could be retrieved separately over one port while a message is being retrieved over another port if the source system allows multiple simultaneous login sessions. Most systems do not allow multiple simultaneous login sessions.

The present invention has been described with respect to migrating a mailbox in a single session. However, it is possible to migrate a mailbox over multiple sessions, if the date and duration of messages is retained so that a migration could continue from where it left off.

The present invention has also been described with respect to denying access to a mailbox by the mailbox subscriber during migration. However, access could be provided by having the host abort the migration to allow the subscriber to log in.

The present invention has been described as using a host and a migration server for migration. However, it is possible to have a single machine (server) do the functions of the host and the migration server. Additionally, as switching systems improve in capability, a switch may become available that could handle the tasks of the host, the server and the switch described herein.

The present invention has been described with the ASR operations being performed before the messages are packaged and transferred to the destination system. The ASR operations can be performed in real-time while the messages are being transferred to the destination system.

The PIN has been described as being a digital representation of the DTMF entered by the subscriber. The PIN can be stored as an audio file. The PIN can also be encrypted. The information transferred to the destination system can to the also be encrypted (using hypertext transmission protocol, secure—HTTPS for example).

The present invention has been described with the system switching an incoming call to the source or destination respective to whether the subscriber has been migrated using a migration flag kept by the host. It is possible to allow the caller to login on the source system, obtain the account number of the caller and switch the call to the destination system if the account is one that has been migrated.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A voice mailbox migration process for migrating voicemail from a source system to a destination system, comprising:
   capturing a pass code of a subscriber without requesting active subscriber participation;
   accessing the source system via a voice telephony interface using the captured pass code;
   moving the voicemail from the source system to the destination system;
   encrypting the pass code using a one-way encryption; and
   supplying the encrypted pass code to the destination system with the voicemail.

2. A voice mailbox migration process for migrating a voicemail message from a source system to a destination system, comprising:
   accessing the source system via a voice telephony interface, playing the message stored in the source system and recording the message as the message is played; and
   storing the recorded voice message in the destination system, the voice mailbox migration process being implemented without requesting active subscriber participation, and
   wherein the recorded message has a message envelope and said process further comprises determining a message envelope in the recorded message and removing the audio envelope from the recorded message, and
   the determining comprises searching for one of a last word and phrase in the message envelope using automated speech recognition.

3. A voice mailbox migration process for migrating a voicemail message from a source system to a destination system, comprising:
   migrating a mailbox from the source system to the destination system;
   determining whether an arriving call is directed to the migrated mailbox;
   routing the call to the source system through a switch when the call is not directed to the migrated mailbox; and
   routing the call to the destination system through the switch when the call is directed to the migrated mailbox.

4. A process as recited in claim 3, further comprising using the switch to capture the pass code when the call is routed to the source system.

5. A process as recited in claim 3, wherein the determining comprises:
   connecting the arriving call to the source system;
   determining an account number for the arriving call; and
   switching the arriving call to the destination system when the determining indicates that the account has been migrated.

6. A process as recited in claim 3, wherein the determining comprises accessing a migration database storing a migration status.

7. A system for migrating a voice message from a source system to a destination system in a telephone system, comprising:
   a digital switching system coupled to the source system, the destination system and the telephone system via voice telephony interfaces;
   a migration machine coupled to the digital switching system via a telephony interface and to the destination system via a data interface, accessing the source system through the digital switching system, retrieving the voice message and storing the message in the destination system without requesting active subscriber participation; and
   a host machine coupled to the switching system and the migration machine, controlling the switching system to provide a connection to an available port of the source system for the machine, initiating a migration operation by the machine and storing the captured pass codes, and
   wherein the digital switching system comprises a digit capture function capturing a subscriber pass code as the pass code is transmitted through the switching system to the source system.

8. A system for migrating a voice message from a source system to a destination system in a telephone system, comprising:
   a digital switching system coupled to the source system, the destination system and the telephone system via voice telephony interfaces; and
   a migration machine coupled to the digital switching system via a telephony interface and to the destination system via a data interface, accessing the source system through the digital switching system, retrieving the voice message and storing the message in the destination system without requesting active subscriber participation; and
   a host machine coupled to the switching system and the migration machine, controlling the switching system to provide a connection to an available port of the source system for the machine, initiating a migration operation by the machine and storing the captured pass code, and
   wherein the digital switching system comprises a digit capture function capturing a subscriber pass code as the pass code is transmitted through the switching system to the source system, and
   the host machine merges MWI data from the source and destination systems.

9. A system for migrating a voice message from a source system to a destination system in a telephone system, comprising:
- a digital switching system coupled to the source system, the destination system and the telephone system via voice telephony interfaces; and
- a migration machine coupled to the digital switching system via a telephony interface and to the destination system via a data interface, accessing the source system through the digital switching system, retrieving the voice message and storing the message in the destination system without requesting active subscriber participation; and
- a host machine coupled to the switching system and the migration machine, controlling the switching system to provide a connection to an available port of the source system for the machine, initiating a migration operation by the machine and storing the captured pass code, and
- wherein the digital switching system comprises a digit capture function capturing a subscriber pass code as the pass code is transmitted through the switching system to the source system, and
- the host machine initiates migration of a mailbox responsive to a call load on the source system.

10. A system for migrating a voice message from a source system to a destination system in a telephone system, comprising:
- a digital switching system coupled to the source system, the destination system and the telephone system via voice telephony interfaces; and
- a migration machine coupled to the digital switching system via a telephony interface and to the destination system via a data interface, accessing the source system through the digital switching system, retrieving the voice message and storing the message in the destination system without requesting active subscriber participation, and
- wherein the switching system is connected to the telephone system by a single set of telephone facilities.

* * * * *

UNITED STATES PATENT AND TRADEMARK OFFICE
CERTIFICATE OF CORRECTION

| | |
|---|---|
| PATENT NO. | : 7,085,554 B2 |
| APPLICATION NO. | : 10/350087 |
| DATED | : August 1, 2006 |
| INVENTOR(S) | : Donald Picard et al. |

It is certified that error appears in the above-identified patent and that said Letters Patent is hereby corrected as shown below:

Column 16, Line 39, change "codes," to --code,--.

Signed and Sealed this

Twenty-sixth Day of December, 2006

JON W. DUDAS
*Director of the United States Patent and Trademark Office*